Figure 1:
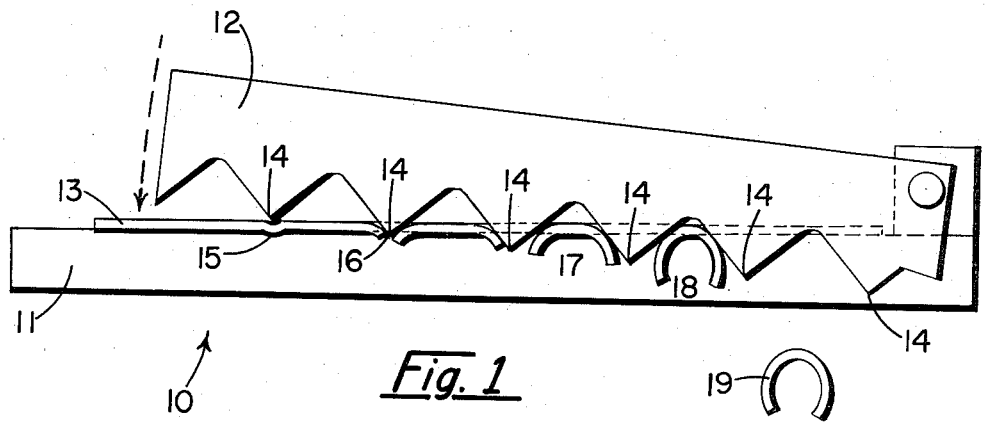

June 23, 1959  E. F. OSWANDEL  2,891,286
RECLAIMING SCRAP SHEET
Original Filed April 23, 1956

INVENTOR.
EDWARD F. OSWANDEL
BY
Agent

United States Patent Office 2,891,286
Patented June 23, 1959

2,891,286
RECLAIMING SCRAP SHEET

Edward F. Oswandel, Henderson, Nev., assignor to Titanium Metals Corporation of America, New York, N.Y., a corporation of Delaware Continuation of application Serial No. 579,782, April 23, 1956. This application January 2, 1958, Serial No. 706,731

3 Claims. (Cl. 18—59.3)

This invention relates to the reclaiming of sheet scrap of refractory metals such as titanium and zirconium and their alloys.

Refractory metals such as titanium and zirconium are generally produced as sponge, granules or powder. These materials are compressed to form compacts which are joined, as by welding, to form an elongated body which can be melted as a consumable electrode in an arc melting furnace to produce an ingot. Scrap sheet cannot ordinarily be reclaimed in the melting operation by introduction into the compact together with virgin metal. This occurs because the sheet is generally of widely varying shapes and sizes and also because the flat surfaces of the sheet pieces introduce planes of weakness in the composite compact and disastrously reduce its strength.

It is the principal object of this invention to provide a method for preparing scrap sheet of metal selected from the group consisting of titanium, titanium base alloys, zirconium and zirconium base alloys for reclaiming. A further object is to provide a method for preparing such scrap sheet in a form adapted for reclaiming by arc melting. Another object is to provide a method for subdividing such scrap sheet into a form suitable for admixture with virgin metal to form a strong cohesive compressed compact. These and other objects of this invention will be apparent from the following detailed description thereof.

This invention, in its broadest aspects, contemplates shearing from a scrap sheet of metal selected from the group consisting of titanium, titanium base alloys, zirconium and zirconium base alloys a plurality of chips in the form of curled, elongated strips, admixing such chips with virgin metal in the form of subdivided sponge, granules or powder to form a compact containing up to 60% by weight of said chips, and compressing said admixture into a cohesive compact. The compact, or a number of them, joined as by welding, is adapted for employment as a consumable electrode in an arc melting furnace to produce a homogeneous ingot containing the reclaimed as well as virgin metal.

The chips are formed by shearing the sheet with a serrated cutting blade. A form of suitable apparatus is shown in the drawing in Fig. 1 which represents a side view of the shear blade employed, and an understanding of the nature of the process for producing scrap sheet chips according to this invention may be obtained by reference thereto. In Fig. 1 the shearing device 10, which may generally have conventional form, action and driving means not shown and which themselves form no part of this invention, is provided with a stationary blade 11 and a hingedly attached movable serrated blade 12. The sheet to be sheared 13 is placed in normal position extending outwardly over the edge of the fixed blade 11, the distance equivalent to the width of the chip to be cut. The crests of the teeth 14 of the movable blade 12 progressively first deform the edge of the sheet as at 15, then break through to laterally separate the segments as at 16. As the strip becomes more nearly sheared off, the ends become bent by contact with the side faces of the teeth as at 17, and this bending is furthered as the chip is forced into the gullet between the teeth as at 18. Final shearing detaches the chips completely from the sheets, and it falls away in curled form as at 19. A full stroke of the blade will produce a number of discrete chips corresponding to the number of teeth interspaces.

Specific design of the serrated shear blade may vary considerably. Best results may be obtained with teeth having depth roughly one-half of the pitch or spacing between crests. The pitch will vary depending on the desired length of strip to form each chip. The crests of the teeth are preferably sharp, although they may be rounded to provide somewhat longer life, and the separation under these conditions will be more of a stretching to final yield breakage rather than the cleaner cut obtained with a sharper edge. It is preferred to provide a rounded gullet between the teeth at their roots; however, for easier fabrication and re-machining the intersection of the teeth faces may be sharp without substantial effect on the chip shape. If desired, the side faces of the teeth may be relieved at an angle, and since this will tend to produce a chip curled more in the form of a helix, some advantage may accrue under certain compacting conditions.

It is a significant and unique feature of the process of this invention that the width of the strips sheared from the sheet determines the degree of curl of the chip. That is, each successive shearing is spaced inwardly from the edge of the sheet the distance to provide the degree of curl desired in the chip. The precise reason for this effect is not known; however, it is postulated that the narrower chip being more formable and possessing less spring back will curl and stay curled more readily than a wider one.

The following table shows the degree of curl obtained in chips sheared from sheet of various thickness from 0.025 to 0.081 inch when cut in widths from 3/32 inch to 9/32 inch.

Table I

| Width of cut: | Average degree of curl |
|---|---|
| 3/32 inch | 145 |
| 5/32 inch | 200 |
| 1/8 inch | 250 |
| 9/32 inch | 320 |

The degree of curl is the principal factor affecting the adaptability of the chips to be admixed with subdivided sponge, granules or powder and compacted, without deleteriously reducing the strength of the so-produced compact. Obviously, insignificant amounts of chips of almost any shape or degree of flatness may be incorporated without appreciable loss of strength. However, it has been found that curled chips produced according to this invention are markedly superior to other forms and when the curl is at least 250°, which is preferred, they may be incorporated in the mixture with sponge up to 60% by weight without affecting the strength of the compact to an undesirable degree. Reference to Table I shows that to obtain the preferred degree of curl, the width of sheet sheared at each stroke should be at least 1/8 inch.

After the scrap sheet is cut up into chips, these are admixed with subdivided virgin sponge, granules or powder of titanium or zirconium, or titanium or zirconium base alloys, or mixtures of titanium or zirconium with alloying ingredients in proportions so that the chip content does not exceed 60%. The mixture is compressed in a conventional press having a die and a movable plunger at pressures up to about 30,000 pounds per square inch or more to form compacts which may be readily joined together, as by welding, to provide a strong elongated body adapted to be employed as the consumable electrode in an arc melting furnace. The following table shows the comparative tensile strengths of compacts compressed at a pressure of about 15,000 pounds per square inch made from pure titanium sponge and from mixtures of this sponge with varying proportions of curled chips according to this invention. A tensile strength of 100 pounds per square inch in the two-inch compact produced under the test conditions indicated acceptable strength in the compact.

Table II

| Compacting Pressure, lbs. sq. in. | Percent by Weight Chips; Balance Ti Sponge | Tensile Strength, lbs. sq. in. |
|---|---|---|
| 14,700 | 0 | 325 |
| 14,700 | 10 | 292 |
| 14,700 | 20 | 252 |
| 14,700 | 30 | 234 |
| 14,700 | 40 | 113 |
| 14,700 | 50 | 101 |

Compacts made from the compositions tested to produce the data in Table II could be joined together by welding to form an elongated electrode which could readily be melted in a consumable electrode arc furnace.

The effect of the addition of chips according to this invention on the strength of the compact is substantially less than that resulting from a similar addition of lathe turnings which are considered to have good properties for this purpose. The following table, for comparison, shows the tensile strength of compacts similar to those of Table II except that lathe turnings were substituted for sheared chips. It will be noted that 30% turnings was the maximum amount which could be employed and still maintain the desired strength level.

Table III

| Compacting Pressure, lbs. sq. in. | Percent by Weight Turnings; Balance Ti Sponge | Tensile Strength, lbs. sq. in. |
|---|---|---|
| 14,700 | 0 | 325 |
| 14,700 | 10 | 192 |
| 14,700 | 20 | 156 |
| 14,700 | 30 | 100 |

It will be appreciated that the compact containing sheared sheet chips may, in addition to titanium or zirconium in sponge, granule or powder form, contain other types of scrap, such as turnings, and also alloying ingredients and possibly other additives. The proportion of chips which may be employed in the compact will depend on the type and amount of these other materials as will be apparent to those skilled in the art. As an example, when 10% lathe turnings is employed in a compact with titanium sponge the amount should not exceed about 20% to maintain a satisfactory strength.

This application is a continuation of application Serial No. 579,782, filed April 23, 1956.

I claim:

1. A method for preparing scrap sheet of metal selected from the group consisting of titanium, titanium base alloys, zirconium and zirconium base alloys to be reclaimed comprising; shearing an edge of said scrap sheet with a serrated shear blade to form a plurality of elongated, curled chips therefrom, admixing said chips with subdivided virgin metal selected from the group consisting of titanium, titanium base alloys, zirconium and zirconium base alloys in amount so that the proportion of chips does not exceed 60%, and compressing said admixture to form a cohesive compact.

2. A method for preparing scrap sheet of a metal selected from the group consisting of titanium, titanium basce alloys, zirconium and zirconium base alloys to be reclaimed comprising; shearing an edge of said scrap sheet with a serrated shear blade to form a plurality of elongated, curled chips therefrom, each shearing being at not less than ⅛ inch inwardly from the edge of said sheet to impart a curl to said chips of not less than 250°, admixing said chips with subdivided virgin metal selected from the group consisting of titanium, titanium base alloys, zirconium and zirconium base alloys in amount so that the proportion of chips does not exceed 60%, and compressing said admixture to form a cohesive compact.

3. A method for preparing scrap sheet of a metal selected from the group consisting of titanium, titanium base alloys, zirconium and zirconium base alloys to be reclaimed comprising; shearing an edge of said scrap sheet with a serrated shear blade to form a plurality of elongated, curled chips therefrom, admixing said chips with virgin metal selected from the group consisting of titanium, titanium base aloys, zirconium and zirconium base alloys in a form selected from the group consisting of subdivided sponge, granules and powder in amount so that the proportion of chips does not exceed 60%, and compressing said admixture to form a cohesive compact.

No references cited.